(12) United States Patent
Kwon et al.

(10) Patent No.: US 8,666,659 B2
(45) Date of Patent: Mar. 4, 2014

(54) SYSTEM AND METHOD FOR PROVIDING GEOGRAPHIC INFORMATION IN PRIVATE WEBPAGE

(71) Applicants: Chang-Young Kwon, Seoul (KR); Jae-Kyu Kim, Seoul (KR)

(72) Inventors: Chang-Young Kwon, Seoul (KR); Jae-Kyu Kim, Seoul (KR)

(73) Assignee: NHN Corporation, Seongnam-si (KR)

( * ) Notice: Subject to any disclaimer, the term of this patent is extended or adjusted under 35 U.S.C. 154(b) by 0 days.

(21) Appl. No.: 13/686,115

(22) Filed: Nov. 27, 2012

(65) Prior Publication Data

US 2013/0085667 A1   Apr. 4, 2013

Related U.S. Application Data

(63) Continuation of application No. 13/416,293, filed on Mar. 9, 2012, now Pat. No. 8,346,479, which is a continuation of application No. 12/162,946, filed as application No. PCT/KR2007/000417 on Jan. 24, 2007, now Pat. No. 8,155,885.

(30) Foreign Application Priority Data

Feb. 1, 2006   (KR) ........................ 10-2006-0009791

(51) Int. Cl.
*G01C 21/00*   (2006.01)
(52) U.S. Cl.
USPC .......................................................... 701/461
(58) Field of Classification Search
USPC .................................................. 701/400, 461
See application file for complete search history.

(56) References Cited

U.S. PATENT DOCUMENTS

| 6,677,894 B2 | 1/2004 | Sheynblat et al. |
| 6,983,139 B2 | 1/2006 | Dowling et al. |
| 2002/0173905 A1 | 11/2002 | Jin et al. |
| 2004/0117358 A1 | 6/2004 | von Kaenel et al. |

FOREIGN PATENT DOCUMENTS

| KR | 10-2001-0037463 | 5/2001 |
| KR | 10-2003-0034811 | 5/2003 |

OTHER PUBLICATIONS

Non-Final Office Action issued for related U.S. Appl. No. 12/162,946 dated Jul. 18, 2011.
Notice of Allowance issued for related U.S. Appl. No. 12/162,946 dated Dec. 13, 2011.
Non-Final Office Action issued for related U.S. Appl. No. 13/416,293 dated Jun. 1, 2012.
Notice of Allowance issued for related U.S. Appl. No. 13/416,293 dated Sep. 28, 2012.

*Primary Examiner* — Yonel Beaulieu
(74) *Attorney, Agent, or Firm* — Greer Burns & Crain Ltd.

(57) ABSTRACT

A geographic information providing system in a personal webpage is disclosed. The geographic information providing system can include a GPS information storing unit, receiving GPS coordinate information related to a location of a user and additional information from a mobile communication terminal and storing the received GPS coordinate information and additional information; a map data loading unit, loading map data having a location corresponding to the GPS coordinate information if a request to access the stored GPS coordinate information and additional information is received; and a temporary layer generating controlling unit, generating a temporary layer to mark the location corresponding to the GPS coordinate information on a loaded map in a form capable of being identified by the user and providing control information for displaying the location corresponding to the GPS coordinate information.

18 Claims, 7 Drawing Sheets

SYSTEM AND METHOD FOR PROVIDING GEOGRAPHIC INFORMATION IN PRIVATE WEBPAGE

CROSS REFERENCE TO RELATED APPLICATIONS

This application is a continuation of U.S. patent application Ser. No. 13/416,293, filed on Mar. 9, 2012, now U.S. Pat. No. 8,346,479, which is a continuation of Ser. No. 12/162,946, filed on Jul. 31, 2008, now U.S. Pat. No. 8,155,885, which is the National Stage Entry of International Application No. PCT/KR2007/000417, filed on Jan. 24, 2007, and claims priority from and the benefit of Korean Patent Application No. 10-2006-0009791, filed on Feb. 1, 2006, which are all hereby incorporated by reference for all purposes as if fully set forth herein.

BACKGROUND

1. Field

The present invention is related to a system and a method of providing geographic information in a personal webpage, more specifically to a system and method that can easily store location information related to a particular place and check the stored location information through a personal webpage.

2. Discussion of the Background

The development of the GIS technology and the network communication technology makes it possible to provide a service showing map data of a particular region and directions to a particular place through Internet portal sites and geographic information sites.

Typically, the geographic information service through the Internet has provided map information related to the region selected by a user and directions between a departing point and a destination.

This geographic information service was useful when the user searched for the location of a particular place and received directions to the searched place. However, it has been difficult to use the geographic information service when the user stored the location of the place or tried to inform another user of the location.

The conventional geographic information service could provide universal geographic information only. It has not been sufficient for the conventional geographic information service to individually provide specialized geographic information to the user. Although today's users request a function capable of storing a not-registered region in the map and another function capable of sharing the stored information with other users, the conventional geographic information service has not been able to meet these requests.

Also, the conventional geographic information service could allow the user to mark a specific location on the map, but the pertinent marking had to be done by hand, thereby becoming troublesome lacking accuracy.

SUMMARY

Accordingly, the present invention, which is designed to solve the aforementioned problems, provides a system and method of providing geographic information in a personal webpage that can allow a user to store location information related to a place, which the user has visited.

The present invention can also provide a system and method of providing geographic information in a personal webpage that can share location information of a place, which a user is currently visiting, with not only the user who stores the location information but also other users, by linking with a mobile communication terminal and storing in real-time the location information in a form of a personal webpage posting.

The present invention can also provide a system and method of providing geographic information in a personal webpage that can easily store not only location information related to a place, which a user visited, but also additional information such as photos, video and description related to the pertinent location and search for the location information along with the additional information.

Other problems that the present invention solves will become more apparent through the following description.

To solve the above problems, an aspect of the present invention features a geographic information providing system in a personal webpage.

The geographic information providing system in a personal webpage in accordance with an embodiment of the present invention can have a GPS information storing unit, which receives GPS coordinate information related to a location of a user and additional information from a mobile communication terminal and stores the received GPS coordinate information and additional information, a map data loading unit, which loads map data including a location corresponding to the GPS coordinate information if a request to access the stored GPS coordinate information and additional information is received, and a temporary layer generating controlling unit, which generates a temporary layer to mark the location corresponding to the GPS coordinate information on a loaded map in a form capable of being identified by the user and provides control information for displaying the location corresponding to the GPS coordinate information.

An application can be installed in the mobile communication terminal when the user makes a request or a predetermined event occurs. The application is for calculating and transmitting, together with additional information, GPS coordinate information corresponding to a location of the user. The mobile communication terminal transmits the GPS coordinate information and the additional information via a mobile communication network or a wireless Internet.

The system can also have a map data storing unit, which stores map data.

In the system, a packet having GPS coordinate information and additional information transmitted from the mobile communication terminal can include user identifying information, and the GPS information storing unit can base on the user identifying information to determine the user having transmitted GPS coordinate information and can store the received GPS coordinate information and additional information in a predetermined bulletin board category of the pertinent user in a form of a posting.

The system can also include a coordinate converting unit, which converts GPS coordinate information into coordinate information corresponding to map data of the map data storing unit if a request to access GPS coordinate information and additional information is received. The map data loading unit can base on the converted coordinate information to load map data of the vicinity.

The coordinate information corresponding to map data of the map data storing unit can be GIS coordinate information.

The system can also have a directions calculating unit, which calculates and provides directions information corresponding to a plurality of locations. If a plurality of postings storing GPS coordinate information are selected, the map data loading unit can load from the map data storing unit map data that can include locations corresponding to a plurality of GPS coordinate information, and the directions calculating unit can calculate and provide directions information related to a plurality of locations marked on the loaded map data.

The personal webpage can include a blog webpage and a personal homepage.

The additional information can include at least one of description information, image information and video information, inputted by the user.

The geographic information providing system in a personal webpage in accordance with another embodiment of the present invention can have a personal webpage server, which receives GPS coordinate information and additional information from a mobile communication terminal and stores the received GPS coordinate information and additional to information in a form of a posting. The personal webpage server can load map data having a location corresponding to the GPS coordinate information and provide map information displaying on the loaded map a location corresponding to the GPS coordinate information in a form capable of being identified by a user, together with the additional information, if a request to access GPS coordinate information stored in the posting form and additional information is received.

An application can be installed in the mobile communication terminal according to a user's request. The application is for calculating and transmitting, together with additional information, GPS coordinate information corresponding to a location of the user. The mobile communication terminal transmits the GPS coordinate information and additional information via a mobile communication network or a wireless Internet.

The personal webpage server can convert GPS coordinate information into coordinate information corresponding to a map of an external map database and can base on the converted coordinate information to load map data of the vicinity if a request to access GPS coordinate information and additional information is received.

The personal webpage server can load from an external map database map data that can include locations corresponding to a plurality of GPS coordinate information and can calculate and provide directions information related to a plurality of locations if a plurality of postings storing GPS coordinate information are selected.

Another aspect of the present invention features a geographic information providing method in a personal webpage.

The geographic information providing method in a personal webpage in accordance with an embodiment of the present invention includes (a) receiving from a mobile communication terminal and storing GPS coordinate information and additional information, (b) loading map data including a position corresponding to the GPS coordinate information if a request to access the received GPS coordinate information and additional information is received, (c) generating a polygonal object for marking a location corresponding to GPS coordinate information on the map data loaded in the step (b), and (d) providing control information for marking the generated polygonal object through a temporary layer.

A packet having GPS coordinate information and additional information transmitted from the mobile communication terminal can include user identifying information. The step (a) can base on the user identifying information to determine the user having transmitted GPS coordinate information and can store the received GPS coordinate information and additional information in a predetermined bulleting board category of the pertinent user in a form of a posting.

The step (b) can include converting GPS coordinate information into coordinate information corresponding to the map data and loading map data of the vicinity in accordance with the converted coordinate information.

If a plurality of postings storing GPS coordinate information are selected, the method can also include loading map data that can include locations corresponding to a plurality of GPS coordinate information and calculating and providing directions information related to a plurality of locations.

The additional information can include at least one of description information, image information and video information, inputted by the user.

The geographic information providing method in a personal webpage can be embodied in a program, and the present invention can provide a recorded medium in which the to program is recorded.

DETAILED DESCRIPTION OF THE ILLUSTRATED EMBODIMENTS

Figure 1:
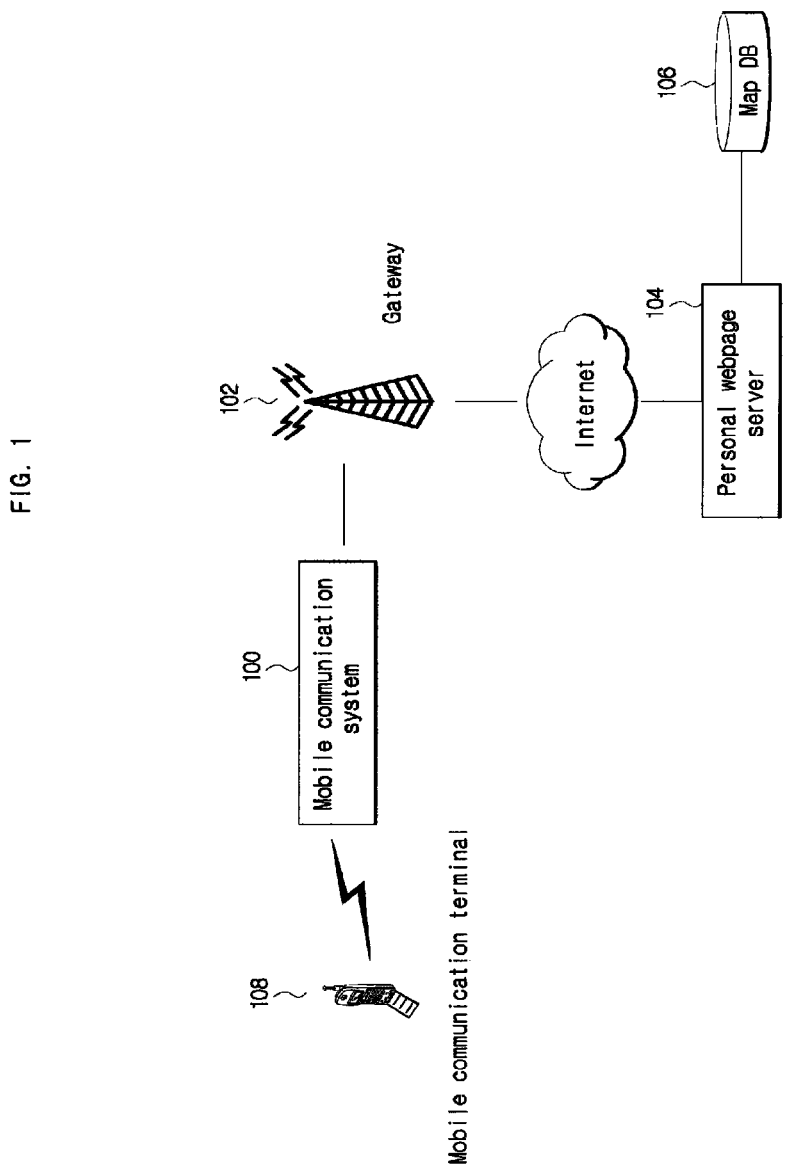
FIG. 1 illustrates the structure of a geographic information providing system in a personal webpage in accordance with an embodiment of the present invention.

The above objects, features and advantages will become more apparent through the below description with reference to the accompanying drawings.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals. Throughout the description of the present invention, when describing a certain technology is determined to evade the point of the present invention, the pertinent detailed description will be omitted.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, preferred embodiments will be described in detail with reference to the accompanying drawings. Identical or corresponding elements will be given the same reference numerals, regardless of the figure number, and any redundant description of the identical or corresponding elements will not be repeated.

FIG. 1 illustrates the structure of a geographic information providing system in a personal webpage in accordance with an embodiment of the present invention.

Referring to FIG. 1, a personal webpage server 104 in the geographic information providing system in the personal webpage in accordance with an embodiment of the present invention can be connected to a mobile communication system 100 through a gateway 102. Also, the geographic information providing system can further include a map database 106.

The present invention is related to a method and a system that store coordinate information related to an area where a user is located and share the stored coordinate information with another user.

In the case of visiting a particular place for traveling or other purposes, there has been no means in the past that put the exact location of the place on record. Accordingly, the present invention suggests a method and a system that can store information related to the place visited by the user in the personal webpage and allow the stored information to be accessed through the personal webpage.

In FIG. 1, the mobile communication system 100 functions to receive GPS information of the place, where the user is located, from the user's mobile communication terminal 108. The user's mobile communication terminal 108 is equipped with a module for GPS service. If the user requests the transmission of the current location information, the user's mobile communication terminal 108 transmits GPS coordinate information of a current location to the mobile communication system 100 through a communication with a GPS satellite. The mobile communication terminal 108 is pre-equipped with a menu or hot key for transmitting the current location information to the mobile communication system.

Included in the mobile communication terminal 108 can be a portable terminal such as a personal digital assistant (PDA) as well as a mobile phone capable of communicating with the mobile communication system.

A GPS application for extracting and transmitting the GPS coordinate information related to the current location can be installed in the mobile communication terminal 108. The user can request the transmission of the GPS coordinate by using the hot key and a menu of the mobile communication terminal 108 for transmitting the GPS coordinate, and the mobile communication terminal 108 transmits the GPS coordinate information of the current location to the mobile communication system 100 through a mobile communication network in response to the user's request.

In accordance with an embodiment of the present invention, other additional information as well as the GPS coordinate information of the user's current location can be transmitted to the mobile communication system 100. For example, the user can transmit text information, such as the description related to the pertinent place, in addition to the GPS coordinate information, and the mobile communication system receives the GPS coordinate information with the description information through the mobile communication network.

The additional information can consist of multimedia information such as a photo and video in addition to the description information. For example, the user can transmit the photo or video of the current place with the GPS coordinate information, and the mobile communication system 100 receives the multimedia information through the mobile communication network.

In accordance with another embodiment of the present invention, if a predetermined event occurs, the GPS application installed in the mobile communication terminal 108 extracts and stores the GPS coordinate information related to the current location. For example, the GPS application of the mobile communication terminal 108 automatically stores the GPS coordinate information when the user takes a picture by using the mobile communication terminal. At this time, the picture data taken by the user and the corresponding GPS coordinate information can be linked with each other and stored. The user can later transmit the stored GPS coordinate information and the picture data, and the mobile communication system 100 receives the GPS coordinate information and the picture data.

The mobile communication system transmits the received GPS coordinate information and additional information to a personal webpage server 104 of an Internet network through a gateway 102. Here, the gateway 102 converts a protocol packet of the mobile communication network into a protocol packet of the Internet network.

The personal webpage server 104 stores the GPS coordinate information and additional information, received from the mobile communication system, in a form of a posting. The personal webpage server 104 can include any kind of server, such as a blog server and a personal homepage server, which can store and share personal information.

For example, in case that the personal webpage server 104 is a blog server, the webpage server 104 can store the received GPS coordinate information and additional information in a section of a bulletin board that stores the map information. The section of the bulletin board, in which the GPS coordinate information and additional information are stored, is predetermined. When the GPS coordinate information and additional information are received, the received information is stored in a form of a posting in the pertinent bulletin board.

If a user asks for an access to the posting of the received GPS coordinate information and additional information, the personal webpage server 104 provides the map information displayed with a location corresponding to the pertinent GPS coordinate. The personal webpage server 104 has a GIS engine capable of providing the map information to transfer a map displayed with the GPS coordinate location, and loads the map information related to the GPS coordinate location to be displayed from a map database 106 to provide it to the user. Of course, the personal webpage server 104 can provide the map displayed with the GPS coordinate location to the user without the GIS engine, by linking with a server providing the GIS map information. Also, to display the map data, the user client is installed with an application for displaying GIS map data. In accordance with an embodiment of the present invention, the application for displaying the GIS map data can be installed in the user client in a form of Active X control.

The webpage, which displays the map marked with the GPS coordinate location provided by the personal webpage server 104, also displays the additional information, transmitted by the user together with the GPS coordinate.

Accordingly, the user who transmitted the GPS coordinate information and other users who visit the personal webpage of the user can check the map information marked with the GPS coordinate information and the additional information if they ask for an access to the map information and additional information.

The above description explains a case that the personal webpage 104 receives the GPS coordinate information and stores the received information in the form of the corresponding posting, and then, performs all functions providing the map displayed with the stored GPS coordinate information and additional information. However, it is well-known to those of ordinary skill in the art that the functions of the personal webpage 104 can be divided by and performed by a plurality of servers.

As described above, the map information service system in accordance with an embodiment of the present invention can easily store location information related to the place that the user is visiting. In the prior art, however, the user could only receive location information of or directions to a desired place only through a typical map information service, and has not been able to store a particular location on the map. However, in accordance with the present invention, the user can store not only location information related to a location where the user is visiting, by simple manipulation of a terminal but also the additional information. Also, the location information and the additional information can be shared with other users, by storing the location information and the additional information in the form of a personal webpage posting.

Figure 2:
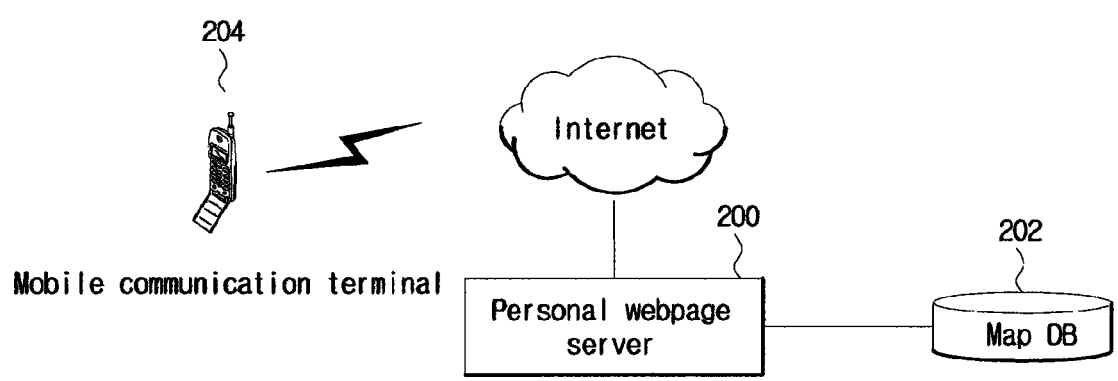
FIG. 2 illustrates the structure of a geographic information providing system in a personal webpage in accordance with another embodiment of the present invention.

FIG. 2 illustrates the structure of a geographic information providing system in a personal webpage in accordance with another embodiment of the present invention.

FIG. 2 illustrates a system in which the GPS coordinate information and additional information transmitted by the user through a mobile communication terminal is transmitted through the wireless Internet instead of the mobile communication network.

As illustrated in FIG. 2, the mobile communication terminal 204 can also access the Internet directly without passing through the mobile communication network to transmit the GPS coordinate information and additional information. At this time, the mobile communication terminal 204 is installed with an application transmitting the GPS coordinate information and additional information to the personal webpage server 200 according to a user's request. The mobile communication terminal 204 can be also equipped with a hot key for promptly dealing with the user's request.

The mobile communication terminal 204 can wirelessly transmit the GPS coordinate information and additional information by using an access point in the vicinity. The transmitted GPS coordinate information and additional information is transmitted to the personal webpage 200 through the Internet.

While the method of transmitting the GPS coordinate information and additional information of FIG. 2 is different from FIG. 1, the operations of the personal webpage server 200 and the map database 202 of FIG. 2 are the same as FIG. 1.

Figure 3:
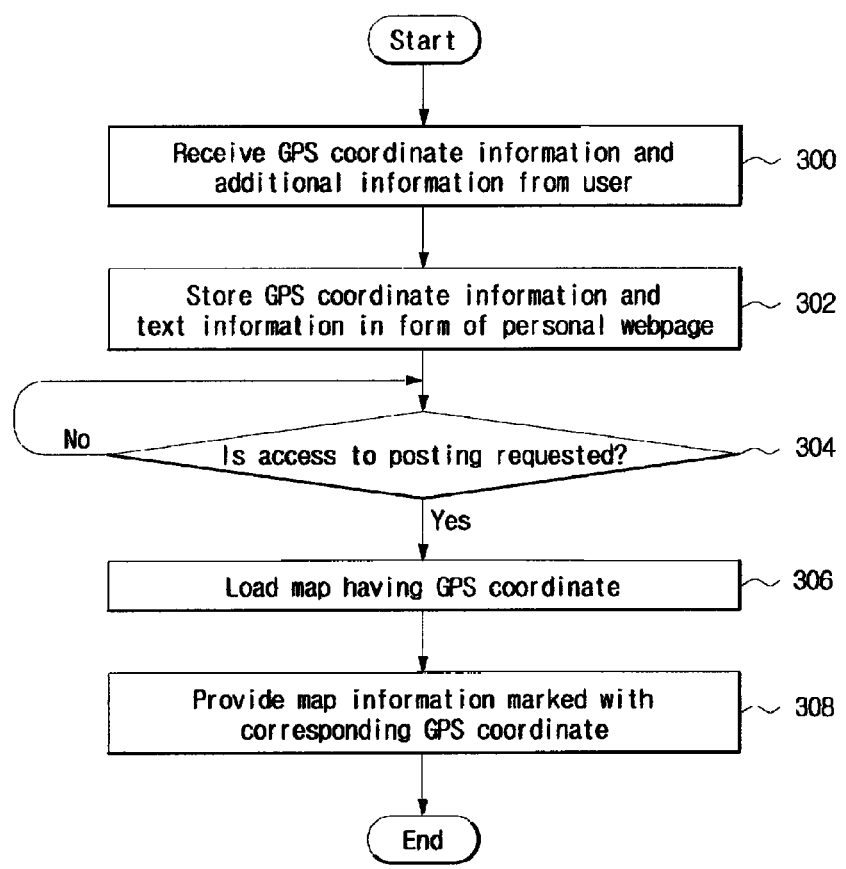
FIG. 3 is a flow chart illustrating the overall process of providing geographic information in a personal webpage in accordance with an embodiment of the present invention.

FIG. 3 is a flow chart illustrating the overall process of providing geographic information in the personal webpage in accordance with an embodiment of the present invention.

Referring to FIG. 3, the personal webpage server firstly receives the GPS coordinate information and additional information, transmitted by a user, from the user's mobile communication terminal in a step represented by 300. As described above, the GPS coordinate information and additional information can be passed through the mobile communication network and be received. Alternately, the GPS coordinate information and additional information can be directly received through the wireless Internet. The packet transmitting the GPS coordinate information and additional information includes identifying information of the user as well.

The personal webpage server, which received the GPS coordinate information and additional information, stores the GPS coordinate information and additional information in a form of the personal webpage posting in a step represented by 302. If the GPS coordinate information and additional information are received, the personal webpage server gives a posting ID to corresponding information and stores it in the form of a posting. The personal webpage can have various categories of bulletin boards.

The category of the bulletin board storing the GPS coordinate information and additional information is pre-configured. For example, in case that there is separately provided a geographic information bulletin board, the GPS coordinate information and additional information can be stored in a form of a posting of the geographic information bulletin board. Since the pertinent information is stored in the posting form, a posting title and a posting number of the corresponding board are given to the information. The posting title can be extracted from the additional information inputted by the user. If there is no additional information, the time of sending the posting can be set as the posting title. The posting number is successively numbered by comparing with the other postings stored previously.

As such, the GPS coordinate information and additional information stored in the form of a posting can be accessed by other users as well as the user who stored the GPS information. The personal webpage server determines whether other users ask for the access to the stored posting in a step represented by 304.

If the user asks for the access to the posting, the personal webpage server provides to the user not simply the stored GPS coordinate information and additional information but map information capable of identifying the GPS coordinate location. For this, the webpage server loads the map having the GPS coordinate information corresponding to the asked posting from the map database in a step represented by 306.

As described earlier, the personal webpage server can include the GIS module capable of loading and displaying the map data. Alternatively, the personal webpage server can link with the server providing the geographic information.

Once the map data is loaded, the map information, marked with a location corresponding to the GPS coordinate transmitted by the user, is transmitted to the user in a step represented by 308. The webpage, displayed with the map information, is displayed with the additional information, transmitted by the user together with the GPS coordinate information. Through the operations of FIG. 3, the user who transmitted the GPS coordinate information can easily check an exact location of a location, which the user has visited, through the map and provide to other users the location information related to the place that the user has visited. Also, since the description, photo, and video information related to the location that the user has visited can be provided through the additional information, a wider variety of information can be stored and provided.

In accordance with another embodiment of the present invention, the service can allow the user to see additional information of plural users together. For example, in case that the user selects a posting of another user, there can be a menu that allows the user to access not only to a map and additional information capable of identifying the GPS coordinate of a corresponding posting but also the additional information of another user having the same GPS coordinate as the posting or within a predetermined range. For example, if the selected posting is the GPS coordinate of the Seorak Mountain, the additional information of the selected posting and other posting information corresponding to the GPS coordinate of the Seorak Mountain can be provided. Accordingly, the user can access the additional information of another user by selecting one of the provided posting information.

Also, it is possible to access the additional information, uploaded by various users, through the search using the GPS coordinate information. For example, in case that the user inputs a particular GPS coordinate into a searching window, a list of the posting corresponding to the GPS coordinate within a predetermined range is provided. Accordingly, the user can access the additional information of various users by selecting at least one of provided postings.

Figure 4:
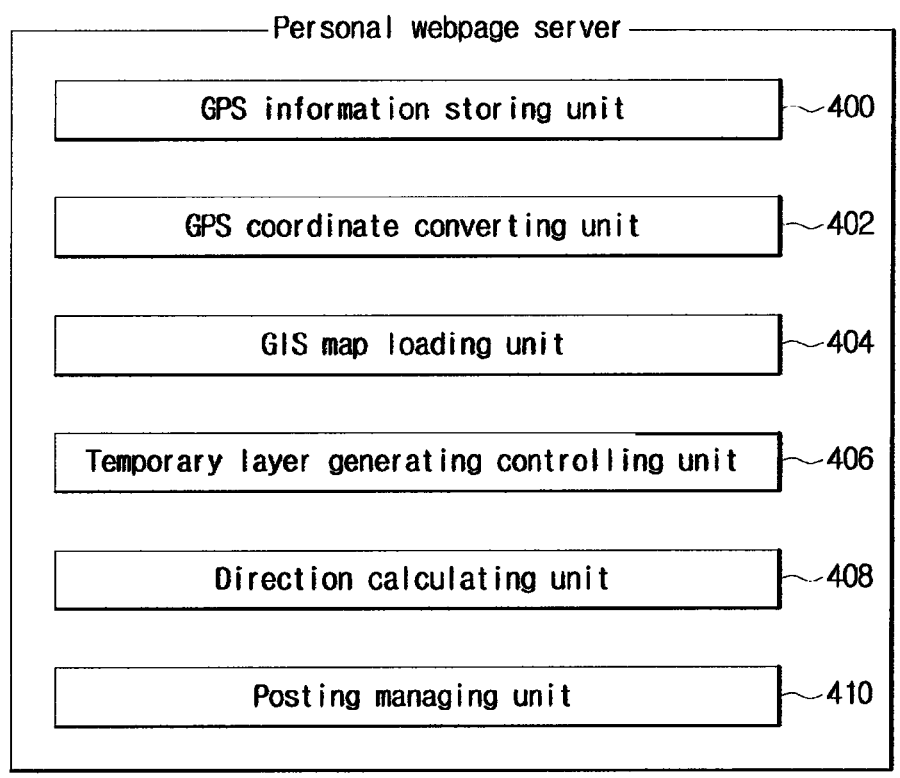
FIG. 4 is a block diagram illustrating the structure of a personal webpage server in accordance with an embodiment of the present invention.

FIG. 4 is a block diagram illustrating the structure of the personal webpage server in accordance with the embodiment of the present invention.

Referring to FIG. 4, the personal webpage server in accordance with the embodiment of the present invention can include a GPS information storing unit 400, a GPS coordinate converting unit 402, a GIS map loading unit 404, a temporary layer generating controlling unit 406, a directions calculating unit 408 and a posting managing unit 410.

The GPS information storing unit 400 receives and stores GPS coordinate information related to the user's current location and corresponding additional information, transmitted from the user mobile communication terminal. The GPS information storing unit 400 recognizes the packet transmitting the GPS coordinate information through the identifier of the transmitted packet and stores the transmitted information in a form of the posting. As described above, to store the transmitted information in the form of the posting, the GPS information storing unit 400 gives a posting ID and stores the received information in a form of a predetermined board category posting.

If the user asks for the access to a posting, the GPS coordinate converting unit 402 converts the GPS coordinate information, stored in a form of the posting, into the coordinate information of a GIS map. To mark a location corresponding to the GPS coordinate on the GIS map, the process of converting the GPS coordinate into the GIS coordinate is performed. In accordance with an embodiment of the present invention, the GPS coordinate can be converted into the GIS coordinate by use of a mapping table. In accordance with another embodiment of the present invention, the converting process can be performed through a predetermined converting algorithm by using the altitude and longitude information. Since the coordinate conversion is a known technology, the pertinent detailed description will be omitted.

The GIS map loading unit 404 loads the map of the vicinity based on the GIS coordinate converted by the GPS coordinate converting unit 402. The scale and scope of map can be varied depending on the user's setting. Different scales and scopes of the maps can be loaded depending on the user's request. The loaded GIS map data is transmitted to the user client.

The temporary layer generating controlling unit 406 controls a temporary layer, for marking a location corresponding to the GPS coordinate transmitted by the user on the map loaded by the GIS map loading unit 404, to be generated on a map displayed on the user client. Various polygonal objects for representing a building, a road and so on are stored in the map data stored in the map database. However, it is not possible for the map data to store every location transmitted by the user and its corresponding polygonal object.

Accordingly, in accordance with an embodiment of the present invention, a polygonal object to mark a location corresponding to the GPS coordinate transmitted by the user on the map is dynamically generated. Control information for marking the polygonal object dynamically generated through the temporary layer is transmitted to the user client. The control information is provided by the temporary layer generating controlling unit 406. The polygonal object can be dynamically generated in the personal webpage server and be provided to the user client. Alternatively, the polygonal object can be dynamically generated by a script or a pre-installed application of the webpage. The generated polygonal object is marked in a form of the temporary layer on the map displayed corresponding to the control information of the temporary layer generating controlling unit 406.

The directions calculating unit 408 calculates and provides the directions information provided by a typical GIS map service. Described in the above embodiment is the case of a corresponding GPS coordinate location being displayed through a map if a user transmits an item of GPS coordinate information and stores it in a form of a posting, and then, selects a posting. However, the user can select a plurality of postings and request a plurality of pertinent GPS coordinates to be marked on one map. If the user selects a plurality of postings and locations corresponding to a plurality of pertinent GPS coordinates are marked on the map, the directions calculating unit 408 calculates and provides the directions between each marked location. Since the calculation of the directions is related to a typical technology performed with the GIS engine, the pertinent detailed description will be omitted. The detailed method of providing a plurality of postings selected by the user will be described below with reference to the pertinent drawing.

The posting managing unit 410 receives and processes posting managing to information of a user. The posting managing unit 410 receives and processes user request information, such as the deletion, renewal and generation of postings.

As described above, a plurality of elements of the personal webpage server, illustrated in FIG. 4, can be equipped in one personal webpage server. Alternatively, the elements can be separately equipped in a plurality of servers. In the case of being separately equipped in the plurality of servers, a map information service of the present invention can be provided through a communication between the plurality of servers.

Figure 5:
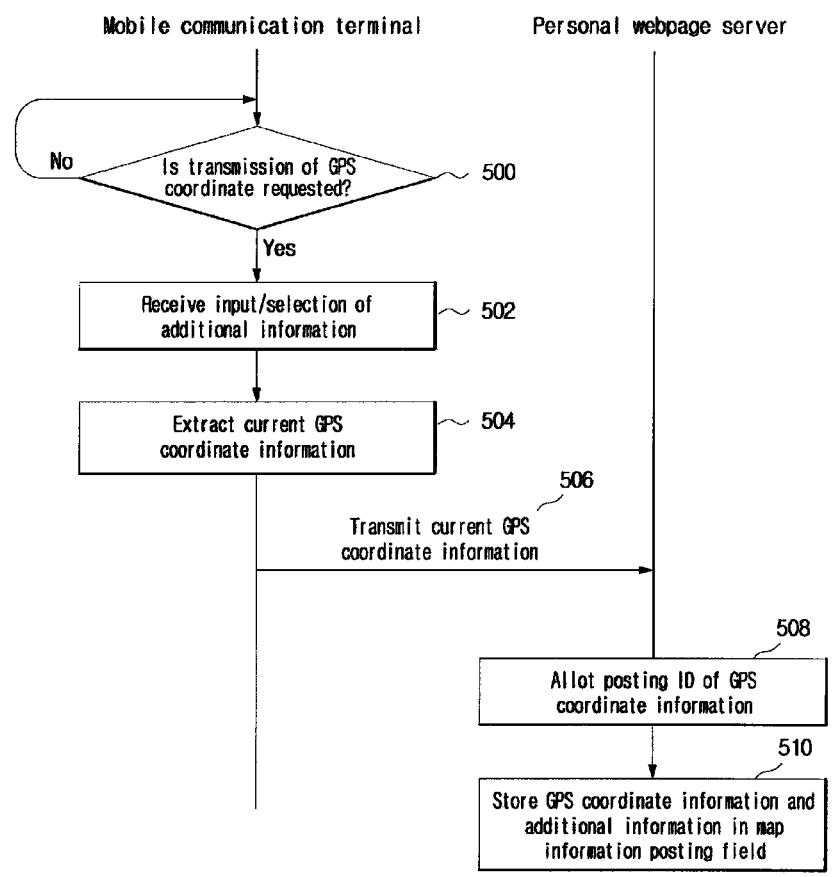
FIG. 5 is a flow chart illustrating the process of providing GPS coordinate information and additional information to a personal webpage server in accordance with an embodiment of the present invention.

FIG. 5 is a flow chart illustrating the process of providing GPS coordinate information and additional information to the personal webpage server in accordance with an embodiment of the present invention.

Referring to FIG. 5, a user requests the transmission of GPS coordinate information corresponding to a current location through a mobile communication terminal in a step represented by 500. If the user requests the transmission of GPS coordinate information corresponding to a current location, an application installed in the mobile communication terminal allows the user to input or select additional information, to be transmitted together with the GPS coordinate, in a step represented by 502. The user can input a description to be provided as the additional information or select a photo or video as the additional information.

If the input/selection of the additional information by the user is completed, a GPS module of the mobile communication terminal calculates GPS coordinate information corresponding to a user's current location through a communication with a GPS satellite. Although FIG. 5 illustrates that the steps represented by 502 and 504 are successively performed, it shall be evident to those of ordinary skill in the art that the steps represented by 502 and 504 can be independently performed or can be performed in an inverse order.

Also, as described above, GPS coordinate information, automatically stored when a predetermined event occurs, in addition to the GPS coordinate information can be transmitted from the user's mobile communication terminal. At this time, the user selects the previously stored GPS coordinate information and additional information and requests the transmission to the personal webpage server.

The additional information and the GPS coordinate information, inputted or selected by the user, are transmitted to the personal webpage server through a network such as the mobile communication network or the wireless Internet network, in a step represented by 506. A packet including the additional information and the GPS coordinate information further includes information capable of identifying the user. A user's mobile phone number can be used as user identifying information. The packet including the user ID, capable of being identified in the personal webpage server, can be used as the user identifying information.

By using the user identifying information included in the packet, the personal webpage server determines who transmits the corresponding packet. Also, the personal webpage server allots a posting ID to store the GPS coordinate information and additional information in a form of the posting in a step represented by 508.

The personal webpage server stores the received GPS coordinate information and additional information in a predetermined posting board category of the user, determined by the user identifying information, in a form of a posting in a step represented by 510.

Figure 6:
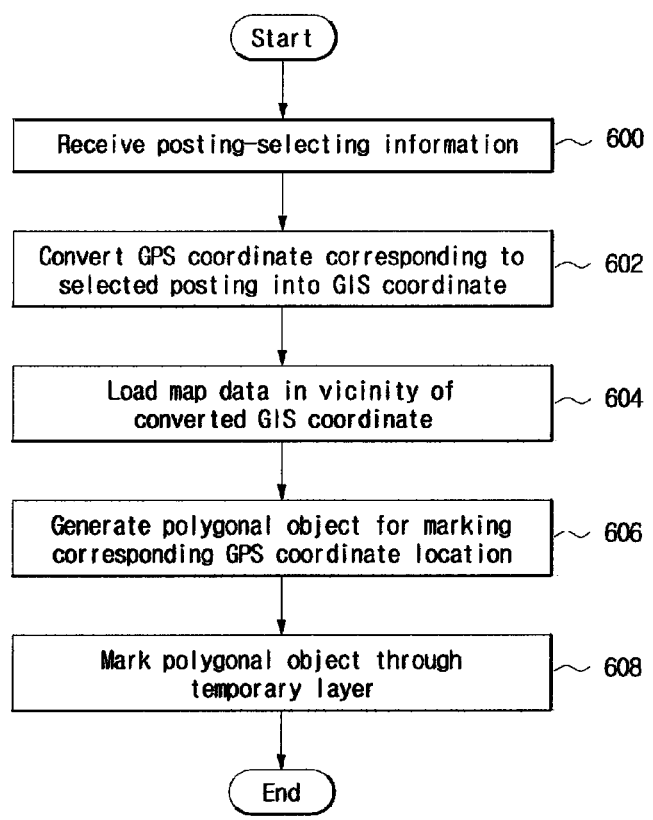
FIG. 6 is a flow chart illustrating the process of providing map information corresponding to GPS coordinate information stored in a form of a personal webpage posting in accordance with an embodiment of the present invention.

FIG. 6 is a flow chart illustrating the process of providing map information corresponding to GPS coordinate information stored in a form of a personal webpage posting in accordance with an embodiment of the present invention.

Referring to FIG. 6, in case that a user selects a posting stored with GPS coordinate information and asks for the access to the posting in a step represented by 600, the personal webpage server converts a GPS coordinate corresponding to the selected posting into a GIS coordinate in a step represented by 602. As described above, the coordinate converting process can be performed by a mapping table or a predetermined algorithm.

If the process of converting into the GIS coordinate is completed, map data in the vicinity of the converted GIS coordinate is loaded from a map database in a step represented by 604.

After the map data is loaded, a polygonal object for marking the transmitted GPS coordinate location on a map is generated in a step represented by 606. The polygonal object for marking the GPS coordinate location can be pre-stored or can be dynamically generated.

A temporary layer is generated to mark the generated polygonal object on the loaded map. The temporary layer for marking the generated polygonal object covers a loaded map layer in a step represented by 608. The polygonal object is marked on an area corresponding to the transmitted GPS coordinate location by allowing the temporary layer to be overlapped with the loaded map layer. Accordingly, the user can check the location corresponding to the transmitted GPS coordinate location.

Figure 7:
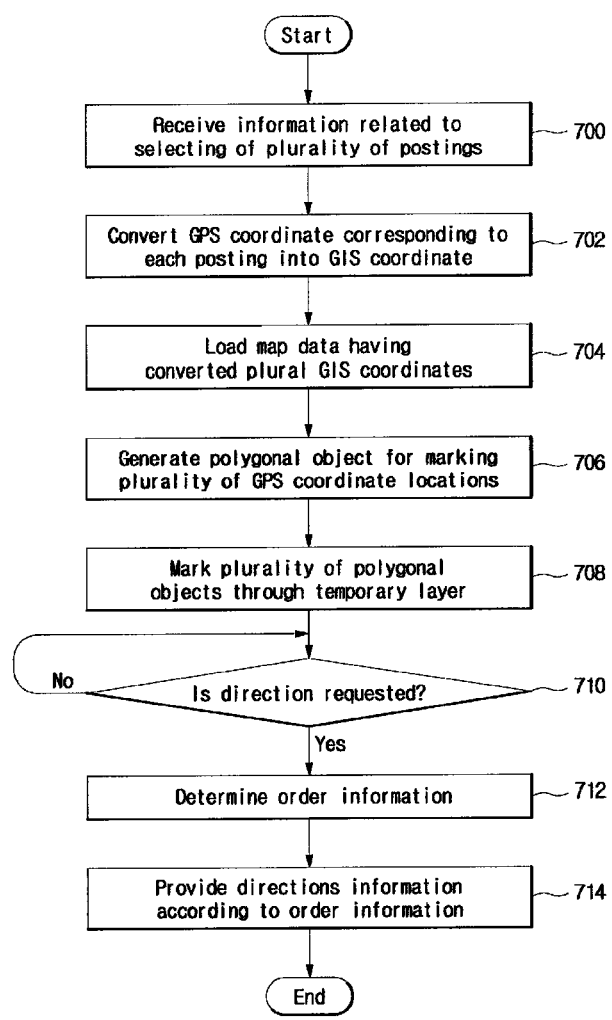
FIG. 7 is a flow chart illustrating the process of providing map information corresponding to a plurality of postings storing GPS coordinate information when selecting the plurality of postings in accordance with an embodiment of the present invention.

FIG. 7 is a flow chart illustrating the process of providing map information corresponding to a plurality of postings storing GPS coordinate information when selecting the plurality of postings in accordance with an embodiment of the present invention.

A user can transmit GPS coordinates of a plurality of places that the user has visited during his or her trip. Also, it is possible to request to see the coordinate information of the plurality of places on one map. For example, in case that the user makes a trip to Kangwon-do and successively visits Chuncheon, Wonju and the Seorak Mountain, the user transmits the corresponding GPS coordinate information at each visited location. FIG. 7 is the flow chart illustrating the case of requesting the coordinate information related to the Seorak Mountain to be displayed on one map.

Referring to FIG. 7, the user selects a plurality of postings among postings stored with the GPS coordinate information and asks for the access to the plurality of postings in a step represented by 700.

The personal webpage server, which receives the access requesting information of the plurality of postings, converts the plurality of GPS coordinates into their respective GIS coordinates in a step represented by 702. After the converting process is performed, map data capable of including a plurality of GIS coordinates are loaded from a map database in a step represented by 704. For example, in the case of selecting the posting stored with the GPS coordinates of Chuncheon, Wonju and the Seorak Mountain, the map data of the scope capable of including all pertinent areas is loaded from the map data. The scale and scope of the loaded map is dynamically set considering the distance between the plurality of GPS coordinates, unlike the case that the map data corresponding to one GPS coordinate.

After the map is loaded, as illustrated in FIG. 6, polygonal objects to mark the plurality of GPS coordinate areas are generated in a step represented by 706. The operation of displaying the polygonal objects through the temporary layer is performed in a step represented by 708.

If the user selects a plurality of postings, directions information related to the corresponding plural areas can be provided, unlike the case of selecting one posting. The order of providing the directions information to the plural areas must be determined when providing the directions information. For example, the directions information can be provided in the order of Chuncheon, Wonju and the Seorak Mountain or in the order of Wonju, the Seorak Mountain and Chuncheon The order information of the plural areas for providing the directions information can be set by various methods. For example, the order can be set according to the access order of the time when the user accesses the GPS coordinate information or the selection order of the posting, selected by the user who accesses the posting. Alternatively, the order can be set according to the posting number. Of course, various other methods for setting the order can be used.

If the user requests the directions information of the plural areas, the order information for calculating the directions of the plural areas is determined in a step represented by 712. If the order information is determined, the directions information of the plural areas is provided according to the determined order information in a step represented by 714.

The drawings and detailed description are only examples of the present invention, serve only for describing the present invention and by no means limit or restrict the spirit and scope of the present invention. Thus, any person of ordinary skill in the art shall understand that a large number of permutations and other equivalent embodiments are possible. The true scope of the present invention must be defined only by the spirit of the appended claims.

As described above, in accordance with some embodiments of the present invention, location information related to a place visited by a user can be easily stored on a map by using a mobile communication terminal, and the location information can be shared with other users as well as the user who stores the location information by linking with the mobile communication terminal and storing in real-time the location information related to the place that the user is visiting in a form of a personal webpage posting.

In accordance with the embodiments of the present invention, in addition to the location information related to the place visited by the user, additional information such as a picture, movie and description related to the pertinent location can be easily stored as well, and the stored location information and additional information can be accessed together.

What is claimed is:

1. A method for providing a location based service associated with a
   webpage via a wireless communication network and a data network, the method comprising:
   receiving location information of terminals comprising a first terminal and a second terminal and additional information associated with the location information, the additional information, transmitted from the first terminal, comprising description information, image information, or video information related to the location information of the first terminal and stored by using a user identifying information corresponding to the first terminal;
   receiving, from the second terminal, a location based request, the request corresponding to at least one of a vicinity of a location of the first terminal, the location information of the first terminal, or the additional information of the first terminal; and
   providing the location based service corresponding to the first terminal by converting the location information and the additional information of the first terminal to display to a webpage of the second terminal, the location information and the additional information being converted from an Internet protocol to a wireless communication protocol.

2. The method of claim 1, further comprising:
   receiving, from one or more servers, vicinity information of the terminals; and
   displaying, to a requested terminal, the location based service comprising the additional information along with map information corresponding to the vicinity information of the respective terminals.

3. The method of claim 2, wherein the location information and the additional information are converted by using a gateway.

4. The method of claim 1, wherein the location information of the terminals comprises global positioning satellite (GPS) information.

5. The method of claim 1, wherein the received location information of the terminals comprises geographic information system (GIS) coordinates.

6. A method using a processor for providing geographic information associated with a webpage comprising a personal webpage, the method comprising:
   receiving Global Positioning System (GPS) coordinate information related to a location of a user terminal and information related to the location comprising one of text information, image information, or video information transmitted from the user terminal;
   transmitting the GPS coordinate information and the information related to the location to a server;
   determining whether to receive an access request of the GPS coordinate information and the information related to the location; and
   displaying map information of the requested GPS coordinate information and providing the information related to the location along with the map information.

7. The method of claim 6, further comprising:
   storing the GPS coordinate information and the information related to the location by using a user identifier.

8. The method of claim 6, further comprising:
   converting the GPS coordinate information into coordinate information corresponding to the map information; and
   loading map information of a vicinity of the location of the user terminal in accordance with the converted coordinate information.

9. The method of claim 6, further comprising:
   performing an application installed in the user terminal in response to detection of the access request, the application configured to transmit the GPS coordinate information and the information related to the location via a network comprising a wireless network comprising a mobile communication network and a wireless internet.

10. The method of claim 6, wherein the personal webpage comprises a personally customized webpage comprising a personal homepage, a personal website, a blog, and a social networking service page.

11. A method using a processor for providing map data associated with a webpage comprising a personal webpage, the method comprising:
    receiving Global Positioning System (GPS) coordinate information related to a location of a first user terminal and information related to the location comprising one of text information, image information, or video information transmitted from the first user terminal;
    transmitting the GPS coordinate information and the information related to the location to a server;
    storing information associated with the GPS coordinate information for posting;
    determining whether to receive an access request by a second user terminal of the GPS coordinate information related to the location of the first user terminal to be posted or GPS coordinate information within a predetermined range from the GPS coordinate information related to the location of the first user terminal to be posted; and selectively displaying map data associated with at least one of the GPS coordinate information related to the location of the first user terminal, the GPS coordinate information within the predetermined range from the GPS coordinate information related to the location of the first user terminal, or the information related to the location comprising one of the text information, the image information, or the video information transmitted from the first user terminal upon receipt of a selection by the second user terminal.

12. The method of claim 11, further comprising:
displaying map data marked with the GPS coordinate information related to the location of the first user terminal.

13. The method of claim 11, further comprising:
converting the GPS coordinate information related to the location of the first user terminal into coordinate information corresponding to a map data; and
loading map data of a vicinity of the location of the first user terminal in accordance with the converted GPS coordinate information.

14. A method using a processor for providing geographic information on a webpage, the method comprising:
receiving Global Positioning System (GPS) coordinate information related to a location of a first user terminal and information related to the location comprising one of text information, image information, or video information transmitted from the first user terminal;
transmitting the GPS coordinate information and the information related to the location to a webpage server;
storing information associated with the GPS coordinate information in a form of posting;
determining whether information having the same GPS coordinate information related to the location of the first user terminal or having GPS coordinate information within a predetermined range from the GPS coordinate information of the location of the first user terminal is requested from a second user; and
displaying at least one of the information of a plurality of users including the first user terminal having the same GPS coordinate information related to the location of the first user terminal or having the GPS coordinate information within the predetermined range from the GPS coordinate information related to the location of the first user terminal that the second user requested.

15. The method of claim 14, wherein the displaying at least one of the information of the plurality users comprises displaying map information marked with the GPS coordinate information related to the location of the first user terminal.

16. The method of claim 15, wherein the displaying map information comprises converting the GPS coordinate information related to the location of the first user terminal into coordinate information corresponding to a map data; and
loading map data of a vicinity of the location of the first user terminal in accordance with the converted GPS coordinate information.

17. A system for providing map information associated with user terminals comprising a first user terminal and a second user terminal over a network comprising a wireless network, the system comprising:
a processor of a server configured to determine whether to receive a request of accessing or transmitting map information of the first user terminal and information related to the map information of the first user terminal, the information related to the map information comprising map information of a vicinity of the first user terminal, and one of text information, image information, or video information; and
a gateway coupled to the network and configured to communicate between the server and the first and second user terminals, wherein the server is further configured to convert GPS coordinate information of the first user terminal into coordinate information corresponding to the map information of the first user terminal and to load the map information of the vicinity of the location of the first user terminal in accordance with the converted coordinate information, and wherein the server is further configured selectively to display the map information of the first user terminal along with the map information of the vicinity of the first user terminal, and to provide information of one of the text information, the image information, or the video information, upon receipt of the accessing request transmitted from the second user terminal or transmitting request by the first user terminal.

18. The system of claim 17, further comprising:
a storage device configured to store the GPS coordinate information and the information related to the map information of the first user terminal by using a user identifier.

\* \* \* \* \*